J. SLAYBAUGH & J. AFF.
CUTTING MACHINE.
APPLICATION FILED MAY 13, 1909.

954,705.

Patented Apr. 12, 1910.

WITNESSES:
J. F. MacIndoe
M. E. Wilkinson

INVENTORS
James Slaybaugh
John Aff
By Mahlon Van Boskirk
Attorney

UNITED STATES PATENT OFFICE.

JAMES SLAYBAUGH AND JOHN AFF, OF PHILADELPHIA, PENNSYLVANIA.

CUTTING-MACHINE.

954,705.

Specification of Letters Patent.   Patented Apr. 12, 1910.

Application filed May 13, 1909. Serial No. 495,737.

*To all whom it may concern:*

Be it known that we, JAMES SLAYBAUGH and JOHN AFF, citizens of the United States, residing at Philadelphia, in the county of Philadelphia and State of Pennsylvania, have invented certain new and useful Improvements in Cutting-Machines, of which the following is a specification.

This invention consists of a novel and simple construction of machine designed particularly for cutting paper, envelops, photographs, or the like.

The construction of the machine is especially adapted to permit of use of the same in offices, or the like, and for facilitating opening of envelops containing correspondence.

For a full understanding of the invention, reference is to be had to the following detail description and to the accompanying drawings, in which—

Figure 1:
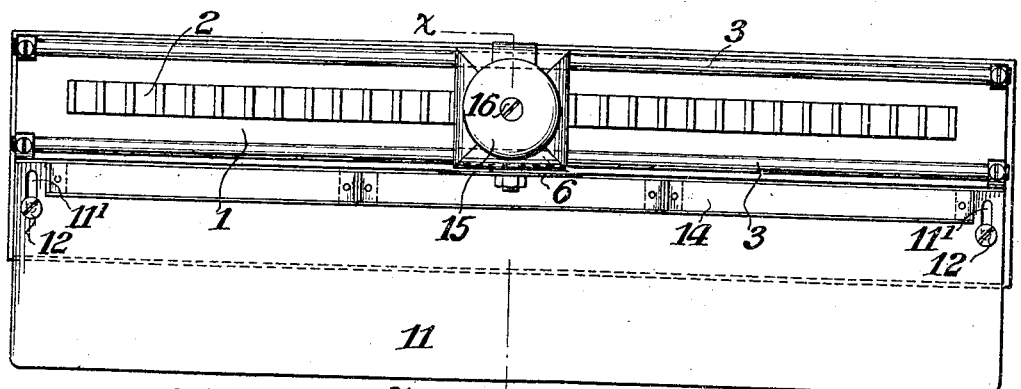
Figure 2:
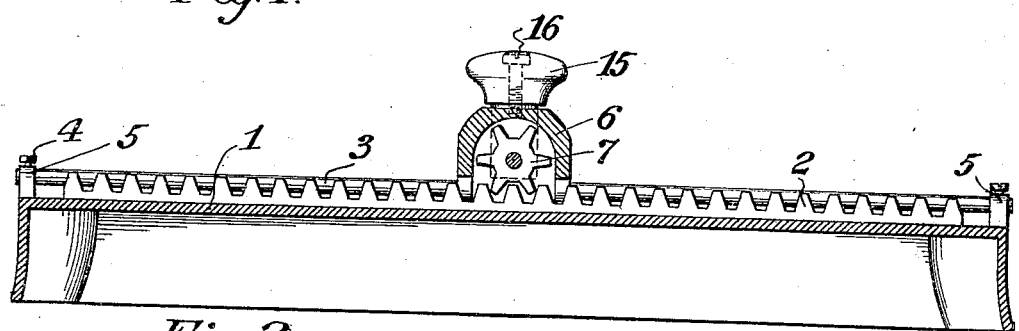
Figure 3:
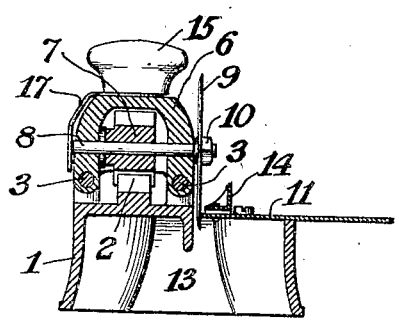
Figure 4:
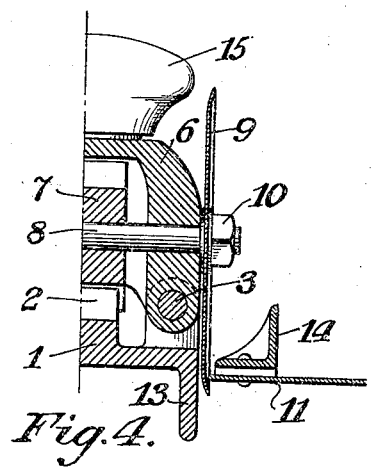

Figure 1 is a top plan view of the machine embodying the essential features of the invention; Fig. 2 is a vertical longitudinal sectional view; Fig. 3 is a transverse section taken about on the line $x$—$x$ of Fig. 1; Fig. 4 is an enlarged transverse section bringing out more clearly certain parts shown in Fig. 3, and partially broken away.

Throughout the following detail description and on the several figures of the drawings similar parts are referred to by like reference characters.

Referring to the drawings and describing the specific arrangement and form of the parts of the invention, the numeral 1 denotes a suitable base which may be of cast metal and which preferably supports the parts of the cutting mechanism a short distance above the support upon which the machine may be placed. On its upper surface the base is provided with a plurality of teeth 2 in longitudinal alinement, and upon opposite sides of the teeth which virtually constitute a rack, are arranged longitudinal guides 3 in the form of bars detachably secured by screws 4 and which screws are carried by lugs 5 at the ends of the base. The lugs 5 are provided with openings receiving the ends of the bars or guides 3.

Mounted for movement longitudinally of the base 1 and slidable upon the guides 3 is a carrier 6, the same to be of hollow structure and containing therein a gear 7, the teeth of which are in mesh with the teeth 2 on the base 1. The gear 7 is keyed or otherwise secured for rotation with a shaft 8 mounted in suitable bearings in opposite sides of the carrier 6, the opposite ends of the shaft 8 projecting through the sides of the carrier supporting the same. Upon the front end of the shaft 8 is secured a circular cutter 9 adapted to rotate with the shaft and held in position by a suitable nut 10.

The top portion of the base 1 adjacent to the outer side of the cutter 9 is cut away and attached to this portion of the base is a horizontal feeding plate 11 which is adjustably secured to the base by means of screws 12 passing through slots 11' in opposite ends of said plate. The space between the inner edge of the plate 11 and the downwardly projecting flange 13 of the base 1 provides a slot in which the rotating cut edge of the cutter 9 is adapted to operate. To the upper side of the plate 11 and near its inner edge portion is secured by suitable fastening means a guide plate 14 that may be made in sections and which is preferably of flanged construction.

Secured to the top of the carrier 6 is a handle or knob 15 adapted to be grasped by the operator in sliding or reciprocating the carrier back and forth on the guides 3. A suitable fastening 16 passes through the handle 15 into the carrier 6 attaching the handle thereto and also securing a spring 17 to the carrier. The upper portion of the spring 17 has an opening through which the member 16 passes and the outer portion of the spring extends downwardly into contact with the outermost end of the shaft 8. The spring 17 normally tends to force the cutter 9 against the inner edge of the feed plate 11 so that said cutter has a clean shearing action in operating upon paper, envelops, or similar material fed thereto between the guide plate 14 and the feed plate 11.

It will be apparent that by adjustment of the feed plate 11 the space between it and the flange 13 may be varied so that the cutter 9 operating in conjunction with the inner edge of the plate 11 will sever a strip of paper of greater or less thickness from the sheet of material placed upon the plate 11. It will be understood that the sheet of material is so disposed upon the plate 11 as to rest with its edge in contact with the flange 13 after which the operator grasps the handle 15 and by imparting longitudinal movement to the carrier 6 the gear 7 and the shaft 8 are rotated and similar movement imparted to the cutter 9 to accomplish the desired cutting operation.

Having thus described the invention, what is claimed as new is:

1. In a cutting machine, the combination of a base provided with a longitudinal rack, a pair of longitudinal guide bars arranged in spaced relation at opposite sides of said rack, a carrier having opposite side portions slidably connected with the guide bars, and being of hollow formation, a shaft mounted on the carrier, a cutter carried by said shaft, a gear arranged within the hollow portion of the carrier and secured for rotation with said shaft, said gear being in mesh with the rack and wholly housed within the carrier, a handle secured to the upper portion thereof, a feed plate secured to the base at the outer side of the cutter, and a spring attached to the carrier and engaging one end of the shaft to exert a force endwise against the shaft to hold the cutter thereon in shearing contact with the feed plate.

2. In a cutting machine, the combination of a base provided with a longitudinal rack, a pair of longitudinal guide bars arranged in spaced relation at opposite sides of said rack, a carrier having opposite side portions slidably connected with the guide bars, and being of hollow formation, a shaft mounted on the carrier, a cutter carried by said shaft, a gear arranged within the hollow portion of the carrier and secured for rotation with said shaft, said gear being in mesh with the rack and wholly housed within the carrier, a handle secured to the upper portion thereof, a feed plate adjusted transversely of the base and toward and from the outer side of the cutter, a fastening securing the handle to the carrier aforesaid, a flat spring having an end thereof arranged between the handle and the carrier and secured in place by the fastening aforesaid, said spring engaging the outer end of the cutter flange, and normally holding the cutter in close contact with the adjacent edge of the feed plate.

In testimony whereof we affix our signatures in presence of two witnesses.

JAMES SLAYBAUGH.
JOHN AFF.

Witnesses:
 M. VAN BOOSKIRK,
 JAS. S. CLIFFORD.